June 12, 1928. 1,673,143

J. H. DUNCAN

AUTO SIGNAL DEVICE

Filed March 21, 1927   2 Sheets-Sheet 1

Inventor
J. H. Duncan
By CA Snow & Co.
Attorneys.

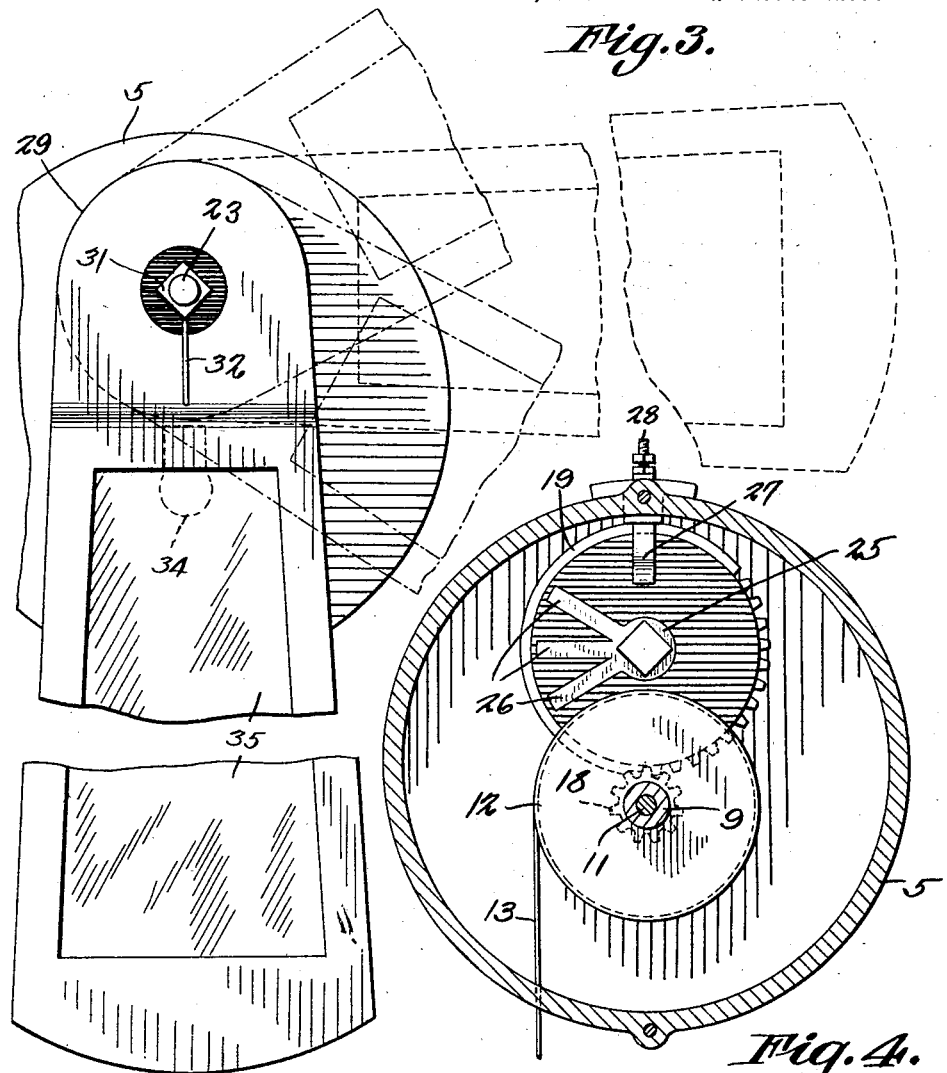

Patented June 12, 1928.

1,673,143

UNITED STATES PATENT OFFICE.

JESSIE H. DUNCAN, OF CROCKETT, TEXAS.

AUTO SIGNAL DEVICE.

Application filed March 21, 1927. Serial No. 177,119.

This invention has reference to signaling devices and more particularly to a signaling device especially designed for use on motor vehicles, the primary object of the invention being to provide a signaling device which may be readily and easily, controlled by the operator, to indicate to persons traveling in proximity to the vehicle equipped with the signaling device, the direction of travel to be taken by the vehicle.

Another object of the invention is to provide a signal of this character which may be secured adjacent to a windshield and provided with illuminating means whereby the signaling arm may be readily observed at night.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 3 is an end elevational view of the signaling device and illustrating the arm in various positions, in dotted lines.

Figure 4 is a sectional view taken on line 4—4 of Figure 1.

Figure 5 is a sectional view through the operating device.

Figures 1, 2:
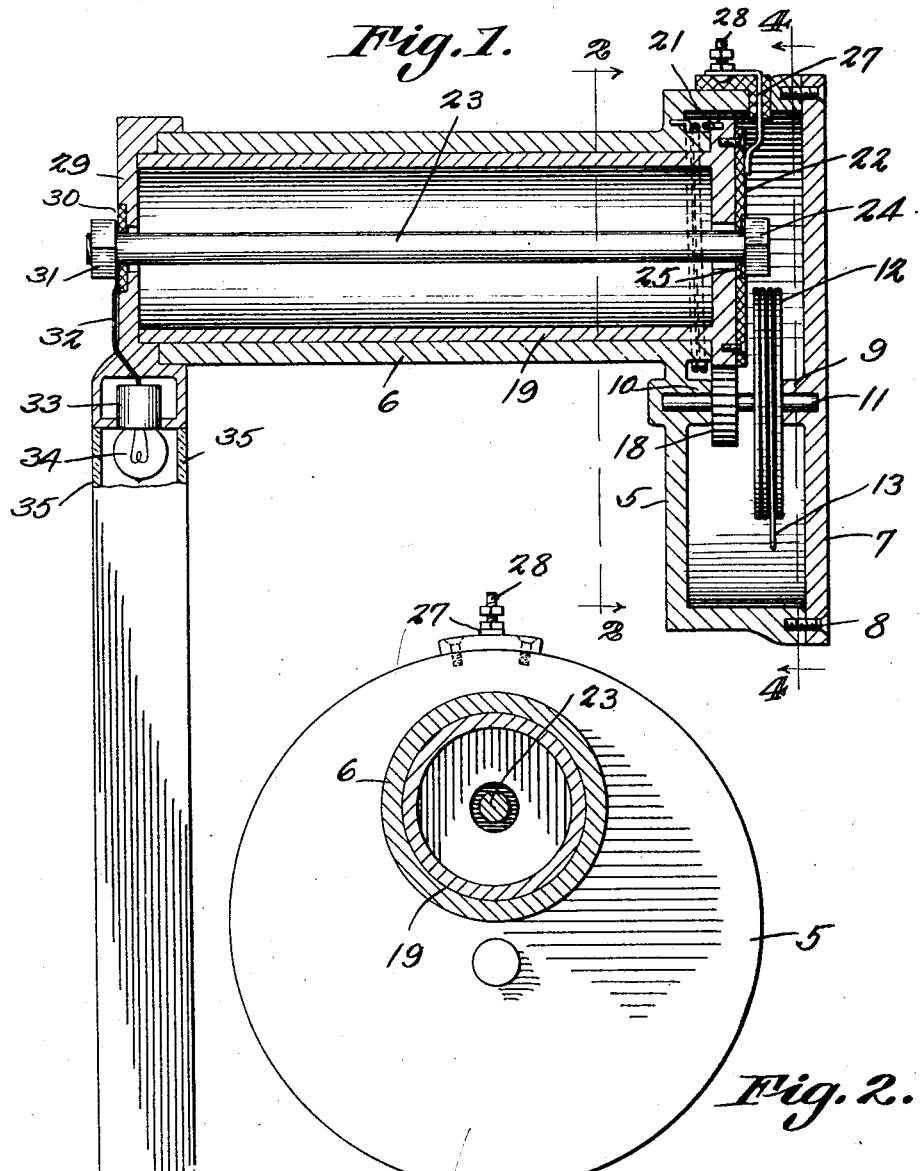
Figure 1 is a sectional view through a signaling device constructed in accordance with the invention.
Figure 2 is a sectional view taken on line 2—2 of Figure 1.

Referring to the drawings in detail, the device includes a casing embodying a gear housing 5 and a tubular supporting section 6 extended at right angles with respect to the housing 5 as clearly shown by Figure 1 of the drawings.

The housing 5 has a removable wall 7 secured by means of the screws 8 and as shown, the wall 7 is provided with an enlargement providing a bearing 9 disposed directly opposite the bearing 10, the aligning bearings being designed to accommodate the shaft 11.

Mounted on the shaft 11 to move therewith is a pulley 12 over which the flexible operating member 13 is wound, the flexible operating member 13 being connected with the plunger 14 or operating member, the same being provided with a finger piece 15 at one end thereof, to permit the same to be conveniently operated. Grooves 16 are formed in the member 14 and are designed to receive the ball bearing 17 that is spring pressed, so that as the member 14 is moved to operate the indicating arm to be hereinafter more fully described, the ball 17 will move into one of the grooves to temporarily lock the member 14 in its position of adjustment.

Gear 18 is mounted on shaft 11 and meshes with teeth formed at the inner end of the tubular member 19 so that movement of the shaft 11 will produce a relative movement of the member 19. A coiled spring indicated at 20 is coiled around the tubular supporting section 6 and has one end anchored therein, while the opposite end of the spring is anchored to the tubular member 19 at 21 so that as the tubular member 19 is moved in one direction, the spring will be placed under tension to return the tubular member 19 to its initial position.

A disk 22 of insulating material is secured within the housing 5 and mounted on the inner end of the tubular member 19. An opening is formed through this disk of insulating material to accomodate the bolt 23 that passes through the tubular member 19, the head 24 of the bolt engaging the contact member 25 that has contact fingers 26 extending therefrom.

These contact fingers 26 are designed to engage the contact member 27, which is in circuit with a suitable source of electric supply, not shown, by wires connected with the terminal 28. The outer end of the bolt 23 passes through the head 29 of the indicating arm, and is insulated therefrom, by the insulating member 30, which is formed with an opening to receive the bolt 23. A nut 31 is secured at one end of the bolt 23 to hold the head in position, and at the same time secure the wire 32 to the bolt 23, which wire 32 connects with the lamp socket 33 to supply electric energy to the lamp 34 mounted in the lamp socket 33.

The indicating arm is of a hollow construction, the side walls thereof being formed of translucent members 35, whereby light rays from the lamp 34 may be projected throughout the length of the indicating arm.

From the foregoing it will be seen that due to this construction, the operator may by operating the member 14 move the arm to various indicating positions to indicate to persons moving in proximity to the vehicle equipped with the device, the movements to be taken by the vehicle.

I claim:

1. In a signaling device, a tubular supporting section having a gear housing at one end thereof, and formed integral therewith, a tubular member supported within the tubular supporting section and having its ends extended beyond the ends of the tubular supporting section, one end of the second mentioned tubular member having teeth, the inner edges of the teeth resting against one edge of the tubular supporting section to restrict movement thereof, a gear mounted within the gear housing and meshing with the teeth of the second mentioned tubular member to rotate the second mentioned tubular member, and a signaling arm secured at the outer end of the second mentioned tubular member.

2. In a signaling device, a tubular supporting member, a gear housing formed at one end of the tubular supporting member, an inner tubular member mounted for rotary movement within the tubular supporting member, one end of the inner tubular member being closed by a wall having a central opening, means cooperating with one end of the inner tubular member for rotating the inner tubular member, a signaling arm positioned over the free end of the inner tubular member, a bolt extending through the opening in the wall at the end of the inner tubular member, said bolt extending through the signaling arm to secure the signaling arm to the inner tubular member, and means for normally urging the inner tubular member to its inactive position.

In testimony that I claim the foregoing as my own, I have hereto affixed my signature.

JESSIE H. DUNCAN.